US012802171B2

(12) United States Patent
Hu et al.

(10) Patent No.: US 12,802,171 B2
(45) Date of Patent: Nov. 17, 2026

(54) IMAGE PROCESSING METHOD AND APPARATUS USED FOR VIDEO CONFERENCING

(71) Applicant: Acer Incorporated, New Taipei City (TW)

(72) Inventors: I-Yuan Hu, New Taipei City (TW); Ling-Fan Tsao, New Taipei City (TW); Yen-Ju Lin, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 364 days.

(21) Appl. No.: 18/509,222

(22) Filed: Nov. 14, 2023

(65) Prior Publication Data

US 2025/0117887 A1 Apr. 10, 2025

(30) Foreign Application Priority Data

Oct. 5, 2023 (TW) ................................ 112138276

(51) Int. Cl.

| | |
|---|---|
| ***G06T 5/50*** | (2006.01) |
| ***G06T 7/194*** | (2017.01) |
| ***G06V 40/16*** | (2022.01) |
| ***H04L 65/403*** | (2022.01) |

(52) U.S. Cl.
CPC ................ *G06T 5/50* (2013.01); *G06T 7/194* (2017.01); *G06V 40/174* (2022.01); *H04L 65/403* (2013.01)

(58) Field of Classification Search
CPC ......... G06T 5/50; G06T 7/194; G06V 40/174; H04L 65/403
See application file for complete search history.

(56) References Cited

U.S. PATENT DOCUMENTS

| | | | | |
|---|---|---|---|---|
| 2010/0079675 | A1* | 4/2010 | Oya | H04N 7/144 348/E9.055 |
| 2018/0176508 | A1* | 6/2018 | Pell | H04L 65/1089 |
| 2021/0120053 | A1* | 4/2021 | Shin | H04L 67/1068 |
| 2022/0141532 | A1* | 5/2022 | Li | G06V 40/174 725/14 |
| 2024/0291944 | A1* | 8/2024 | Scapel | G06F 3/017 |

FOREIGN PATENT DOCUMENTS

| | | | | | |
|---|---|---|---|---|---|
| CN | 111953924 | A | * | 11/2020 | G06F 3/14 |
| CN | 112333516 | | | 2/2021 | |
| CN | 113949891 | | | 1/2022 | |
| CN | 115580696 | A | * | 1/2023 | H04N 7/147 |
| TW | I563825 | | | 12/2016 | |

* cited by examiner

*Primary Examiner* — Chan S Park
*Assistant Examiner* — Emily Rose Hauk
(74) *Attorney, Agent, or Firm* — JCIPRNET

(57) ABSTRACT

An image processing method and an image processing apparatus for video conferencing are provided. In the method, one or more background areas in a shared screen are identified. Whether a size of the one or more background areas conforms to a size of a character representative image is determined. The character representative image is presented in a background area conforming to the size of the character representative image. Therefore, the complete briefing content can be seen.

6 Claims, 7 Drawing Sheets

IMAGE PROCESSING METHOD AND APPARATUS USED FOR VIDEO CONFERENCING

CROSS-REFERENCE TO RELATED APPLICATION

This application claims the priority benefit of Taiwan application serial no. 112138276, filed on Oct. 5, 2023. The entirety of the above-mentioned patent application is hereby incorporated by reference herein and made a part of this specification.

BACKGROUND

Technical Field

The disclosure relates to an image processing technology, and in particular to an image processing method and an image processing apparatus for video conferencing.

Description of Related Art

In the interface of a video conferencing software, a real-time image of the speaker is usually displayed in a certain area of the screen, so that the audience may see the expression and/or gestures of the speaker, which may even make the speech more interesting and the atmosphere more lively. However, since the position and size of the area presenting the image are fixed, the image may block the content of the presentation, prohibiting the audience from reading the presentation easily.

SUMMARY

The disclosure provides an image processing method and an image processing apparatus for video conferencing, which can display real-time images in a suitable background area.

The image processing method for video conferencing according to an embodiment of the disclosure includes (but is not limited to) the following. One or more background areas in a shared screen are identified. Whether a size of the one or more background areas conforms to a size of a character representative image is determined. The character representative image is presented in a background area conforming to the size of the character representative image.

The image processing apparatus for video conferencing according to an embodiment of the disclosure includes (but is not limited to) a storage and a processor. The storage is configured to store program codes. The processor is coupled to the storage. The processor loads the program codes and is configured to perform the following. One or more background areas in a shared screen are identified. Whether a size of the one or more background areas conforms to a size of a character representative image is determined. The character representative image is presented in a background area conforming to the size of the character representative image.

Based on the above, in the image processing method and the image processing apparatus for video conferencing according to the embodiment of the disclosure, the position and size of the background area on the shared screen can be analyzed, and the character representative image can be presented in the background area conforming to the size. In this way, the character representative image covering the briefing content can be avoided, and the audience can smoothly see the complete briefing content information.

In order to make the above-mentioned features and advantages of the disclosure more obvious and easy to understand, the embodiment is specifically mentioned below and explained in detail with reference to the attached drawings.

DESCRIPTION OF THE EMBODIMENTS

Figure 1:
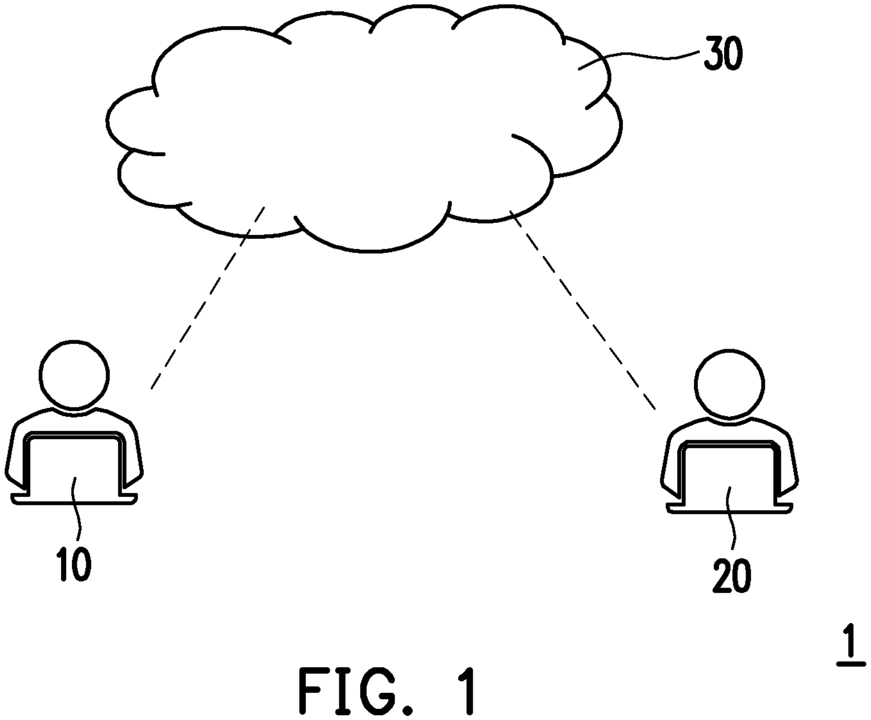
FIG. 1 is a schematic diagram of a conference system according to an embodiment of the disclosure.

FIG. 1 is a schematic diagram of a conference system according to an embodiment of the disclosure. Referring to FIG. 1, a conference system 1 includes (but is not limited to) conference terminals 10, 20, and a server 30.

The conference terminals 10 and 20 may be mobile phones, Internet phones, tablet computers, desktop computers, notebook computers, intelligent assistants, wearable devices, car systems, smart home appliances, or other devices.

The server 30 may be various types of servers, cloud platforms, personal computers, or computer workstations. The server 30 may be directly or indirectly connected to the conference terminals 10 and 20 via a network (e.g., the Internet, a local area network, or a private network).

In an application scenario, the conference terminals 10 and 20 execute video conferencing programs. The conference terminals 10 and 20 may receive sound waves through microphones (for example, dynamic, condenser, or electret condenser types of microphones) and convert into sound signals, capture real-time images through image capturing devices (such as cameras, video recorders, or webcams), capture shared screens (for example, presentations, documents, videos, or image screens) through processors, and/or play sound signals through speakers or play real-time images. The sound signals, real-time images, and/or shared screens may be sent to another conference terminals 10 or 20 via the network through the server 30.

Figure 2:
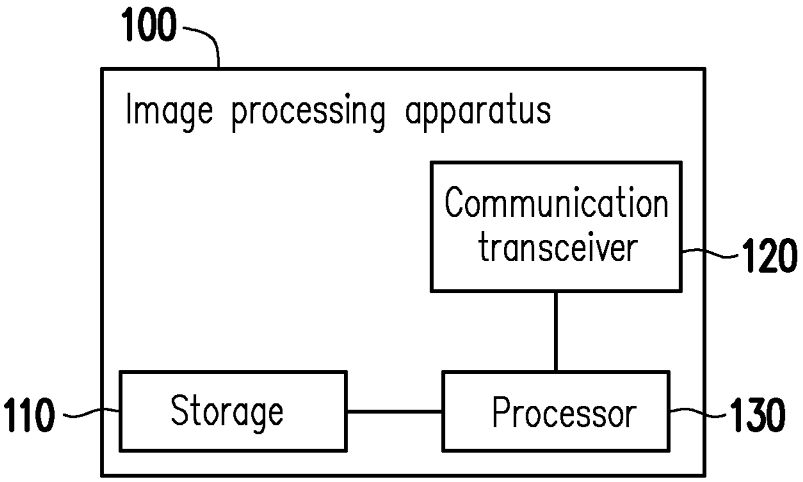
FIG. 2 is a block diagram of elements of an image processing apparatus according to an embodiment of the disclosure.

FIG. 2 is a block diagram of elements of an image processing apparatus according to an embodiment of the disclosure. Referring to FIG. 2, an image processing apparatus 100 may be the conference terminals 10, 20, and/or the server 30 in FIG. 1.

The image processing apparatus 100 includes (but is not limited to) a storage 110, a communication transceiver 120, and a processor 130.

The storage 110 may be any types of fixed or removable random access memory (RAM), read only memory (ROM), flash memory, hard disk drive (HDD), solid-state drive (SSD), or similar elements. In an embodiment, the storage 110 is configured to store program codes, software modules, configurations, data (e.g., screens, images, or configurations of image areas), or files.

The communication transceiver 120 may be a transceiver (which may include (but is not limited to) elements such as connection interfaces, signal converters, and communication protocol processing chips) that supports wired networks such as Ethernet, optical fiber networks, or cables, may also be a transceiver (which may include (but is not limited to) elements such as antennas, digital to analog/analog to digital converters, and communication protocol processing chips) that supports wireless networks such as Wi-Fi, fourth generation (4G), fifth generation (5G), or later generation mobile networks. In an embodiment, the communication transceiver 120 is configured to transmit or receive data.

The processor 130 is coupled to the storage 110 and the communication transceiver 120. The processor 130 may be a central processing unit (CPU), a graphic processing unit (GPU), or other programmable general or special purposes microprocessors, digital signal processors (DSP), programmable controllers, field programmable gate arrays (FPGA), application-specific integrated circuits (ASIC), or other similar elements or combinations of the above elements. In an embodiment, the processor 130 is configured to execute all or part of operations of the image processing apparatus 100 and may load and execute one or more software modules, files, and/or data stored in the storage 110.

In the following, various apparatuses, elements, and modules in the conference system 1 will be used to illustrate the method according to an embodiment of the disclosure. Each process of the method may be adjusted according to the implementation situation, and is not limited thereto.

Figure 3:
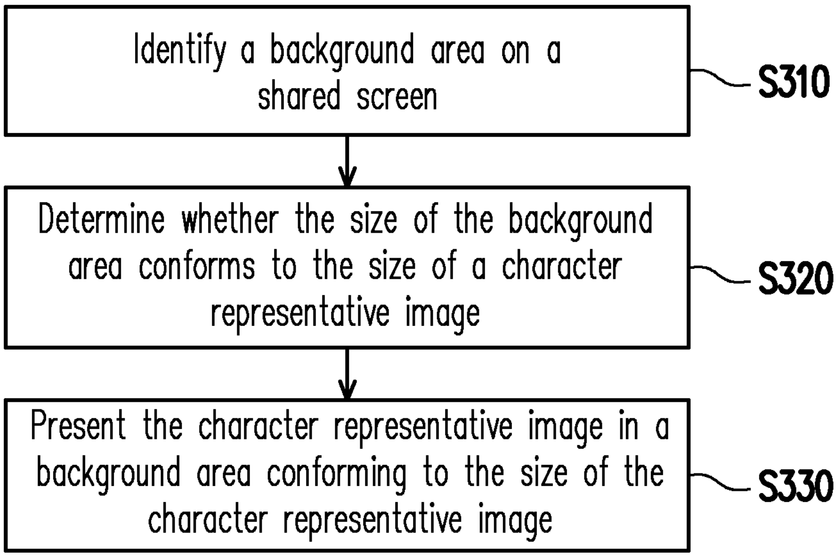
FIG. 3 is a flow chart of an image processing method according to an embodiment of the disclosure.

FIG. 3 is a flow chart of an image processing method according to an embodiment of the disclosure. Referring to FIG. 3, the processor 130 identifies the background area on the shared screen (Step S310). Specifically, the shared screen may be a presentation screen, a document screen, a video screen, a picture screen, a desktop screen, or a window screen. In an embodiment, a video conferencing program provides a screen sharing function. The screen sharing function may (in real-time) capture/record the screen (i.e., the shared screen) of the corresponding presentation, document, video, picture, desktop, or window (i.e., an object desired to be shared) of the selected operation (for example, the click operation received for the object desired to be shared through a cursor, a keyboard, or a touch panel) and transmit (through the server 30) to another conference terminal 10 or 20.

In an application scenario, for the terminal apparatus 10 or 20 of the speaker, the processor 130 thereof captures/records the shared screen (that is, the object desired to be shared is the own screen of the speaker). In another application scenario, for the server 30 or the terminal apparatus 10 or 20 of the audience, its processor 130 may obtain the shared screen captured/recorded by another conference terminal 10 or 20 (i.e., the apparatus of the speaker).

In an embodiment, the shared screen includes one or more content areas and/or one or more background areas. The content area may be an area where texts, symbols, patterns, pictures, and/or object images on the shared screen are located. The background area may be an area other than the content area on the shared screen. For example, an area such as a blank area (the color thereof is not limited to white), an area with a background image, or a background area.

In an embodiment, the processor 130 may identify the background area based on the object detection technology. For example, the processor 130 may use algorithms based on machine learning (for example, YOLO (you only look once), region based convolutional neural networks (R-CNN), or Fast CNN) or algorithms based on feature matching (for example, feature comparison of histogram of oriented gradient (HOG), scale-invariant feature transform (SIFT), Harr, or speeded up robust features (SURF)) to implement the object detection.

The machine learning algorithm can establish the correlation between an input sample and an output result, and the output result corresponding to an image to be identified is inferred accordingly. The image to be identified is, for example, an image of one or more frames of the shared screen. The output result is, for example, the position, shape, and/or size of the background area. The feature matching algorithm can store features of background areas of one or more shapes and/or types in advance and apply to subsequent matching/comparison for determination.

For machine learning models, the processor 130 may use a data set to train, test, and/or verify the models. Images in the data set have been tagged with locations and categories of the objects, for example, a tag for the background area. Taking YOLO as an example, the processor 130 uses the MS COCO (Microsoft common objects in context) data set to train the fifth generation YOLO model and identify the background area on the shared screen accordingly. However, the embodiment of the disclosure does not limit the source or format of the data set.

In an embodiment, the processor 130 may define/set the size and/or shape of the background area. For example, having a specific length to width or an area ratio relative to the shared screen in size. Shapes may be rectangular, circular, or other geometric shapes, or may be irregular or figurative shapes.

Figure 4:
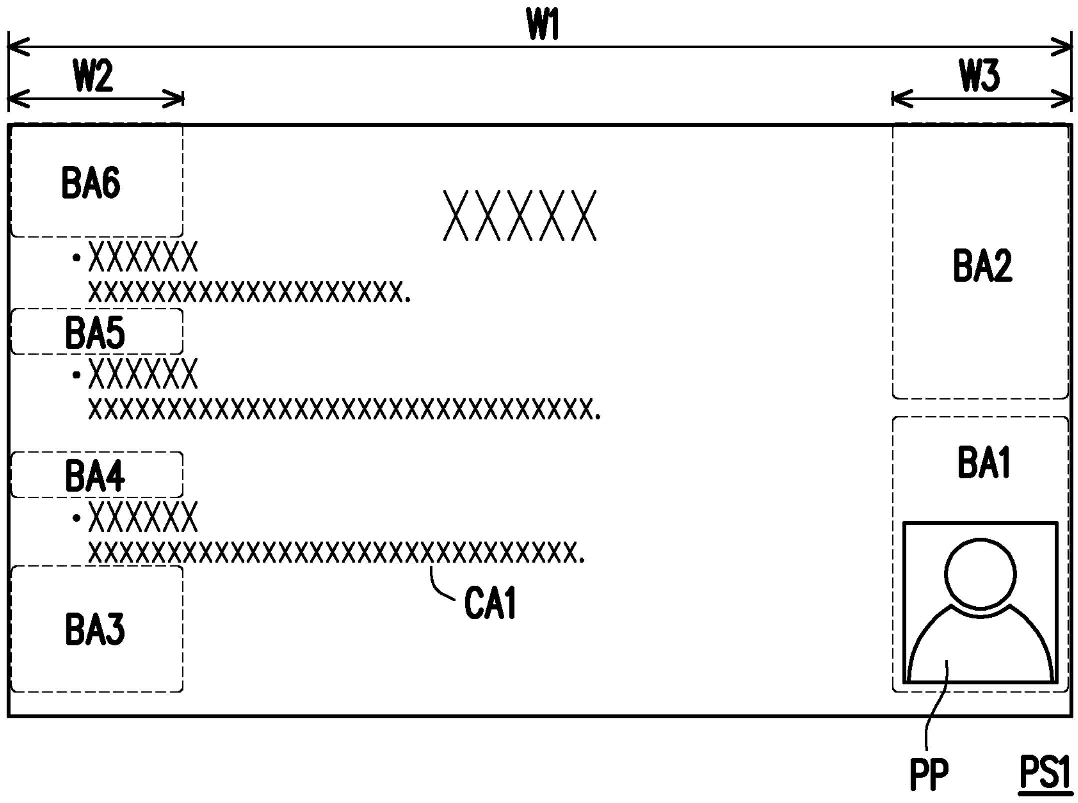
FIG. 4 is a schematic diagram of a shared screen and background areas according to an embodiment of the disclosure.

For example, FIG. 4 is a schematic diagram of a shared screen PS1 and background areas BA1 to BA6 according to an embodiment of the disclosure. Referring to FIG. 4, the shared screen PS1 has a width W1. The processor 130 may be limited to identify the rectangular background areas BA1 to BA6 in areas of widths W2 and W3 on the left and right sides of the shared screen PS1. The widths W2 and W3 are, for example, ⅙ of the width W1. However, the shape and size of the area corresponding to the widths W2 and W3 may still be changed according to requirements.

The processor 130 may organize the background areas BA1 to BA6 into a background area list according to positions thereof on the shared screen PS1. For example, generally, there may be a large background area in the lower right corner of the screen. As shown in the drawing, a content area CA1 is interspersed with the background areas BA3 to BA6 on the left side of the screen, and sizes of the background areas BA1 to BA2 are larger than the background areas BA3 to BA6. Regarding the sequencing in the background area list, for example, the right side has the first priority and the lower side has the next priority. Therefore, the background areas in the background area list are sequentially BA1, BA2, BA3, BA4, BA5, and BA6. That is, from the lower right to the upper right, and then from the lower left to the upper left. However, the arrangement rules of the background area list may have other variations and are not limited to the above example. For example, the arrangement rule may be in sequence based on the size of the background area.

Referring to FIG. 3, the processor 130 determines whether the size of the background area conforms to the size of the character representative image (Step S320). Specifically, the character representative image may be a real-time image, a virtual character image, a photo, or an animation captured through an image capturing device. In an application scenario, a character representative image is an image that represents a speaker (for example, a member who provides the shared screen). The processor 130 determines whether the size of the background area can contain the character representative image.

Figure 5:
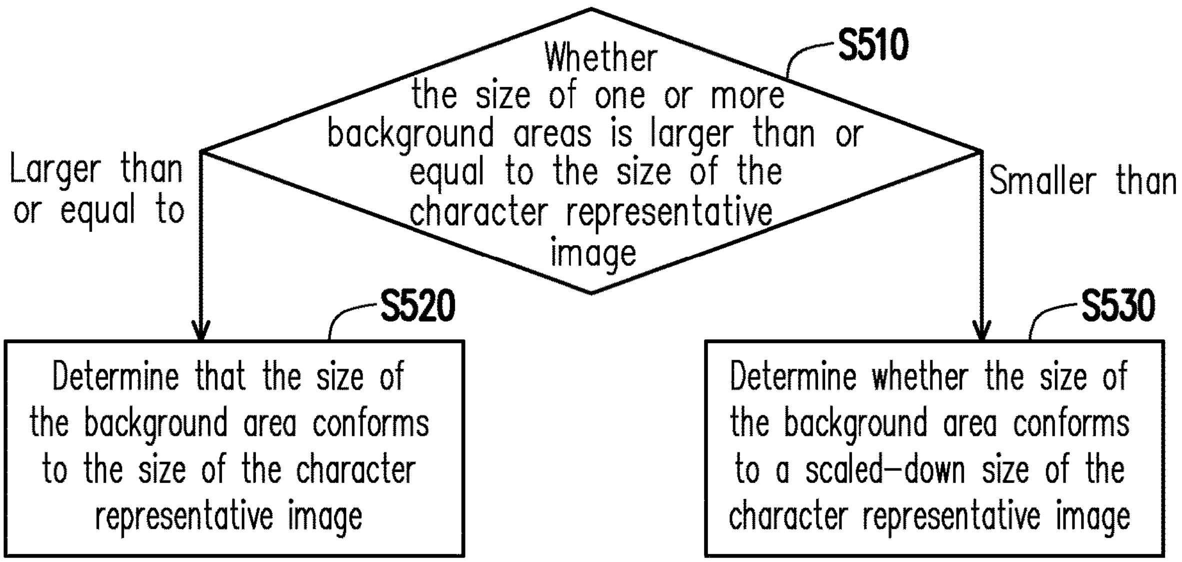
FIG. 5 is a flow chart illustrating size comparison according to an embodiment of the disclosure.

FIG. 5 is a flow chart illustrating size comparison according to an embodiment of the disclosure Referring to FIG. 5, the processor 130 may determine whether the size of one or more background areas is larger than or equal to the size of the character representative image (Step S510). For example, the background area and the character representative image are both rectangular, so lengths and widths may be compared. For another example, the character representative image is circular or oval, and the vertical length and horizontal length may be compared.

Figure 6:
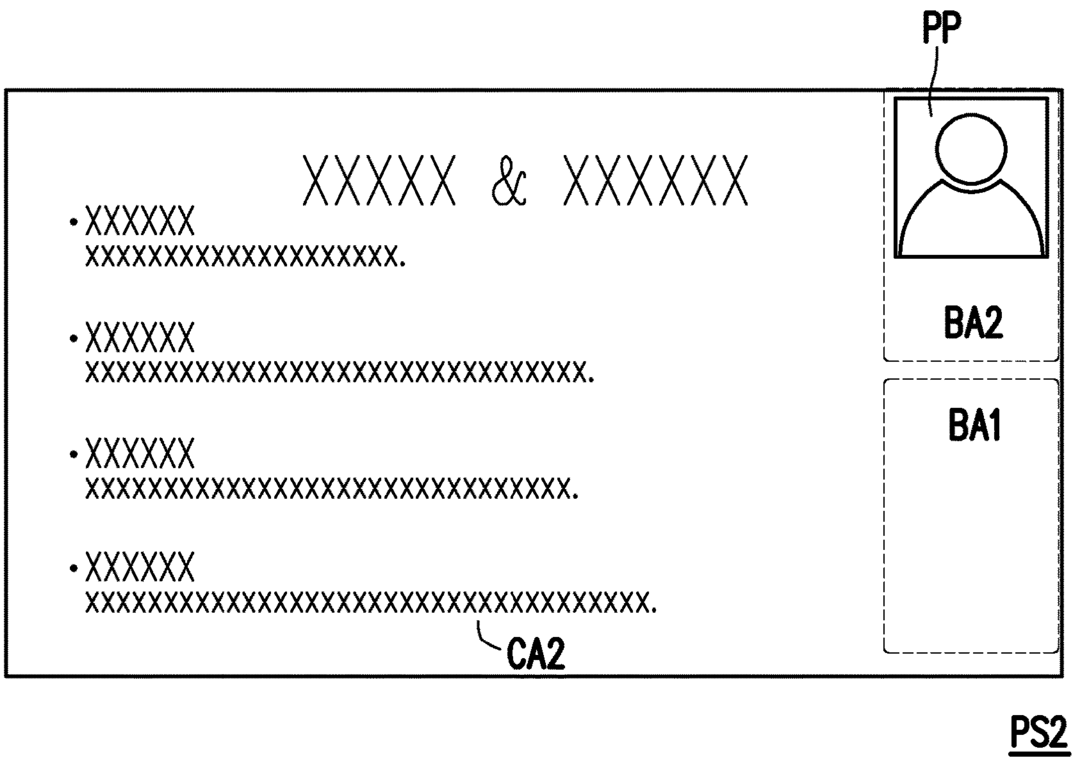
FIG. 6 is a schematic diagram illustrating the size comparison according to an embodiment of the disclosure.

Taking FIG. 4 as an example, the size of the background area BA1 is larger than the size of a character representative image PP. For another example, FIG. 6 is a schematic diagram illustrating the size comparison according to an embodiment of the disclosure. Referring to FIG. 6, a shared screen PS2 includes the background areas BA1, BA2, and a content area CA2. The size of the background area BA2 is larger than the size of the character representative image PP.

In an embodiment, the processor 130 may sequentially compare the background area and the character representative image according to the arrangement sequence in the background area list.

In a case that the size of the background area is larger than or equal to (or not smaller than) the size of the character representative image, the processor 130 may determine that the size of the background area conforms to the character representative image (Step S520). For example, the background area and the character representative image are both rectangular, and the length and width of the background area are respectively larger than the length and width of the character representative image.

On the other hand, in a case that the size of the background area is smaller than the size of the character representative image, the processor 130 may determine whether the size of the background area conforms to a scaled-down size of the character representative image (Step S530). The scaled-down size refers to a size smaller than the size in Step S510 or a size smaller than the initial size. When the sizes of all background areas are smaller than the size of the character representative image, it means that all background areas cannot contain the current size of the character representative image. The processor 130 scales down the size of the character representative image according to a preset ratio (e.g., 3%, 5%, or 10%). That is, the scaled-down size is a smaller preset ratio than the previous size. However, the scaled-down range may still be adjusted according to actual requirements. Next, the processor 130 may determine whether the size of the one or more background areas is larger than or equal to the scaled-down size of the character representative image.

In an embodiment, whenever the sizes of all background areas are smaller than the scaled-down size of the character representative image, the processor 130 continues to scale down the size of the character representative image and determine whether the size of the background area conforms to the scaled-down size of the character representative image until the scaled-down size is smaller than or equal to a lower limit of the size. The lower limit of the size is, for example, half of the initial size, but is not limited thereto.

Figure 7:
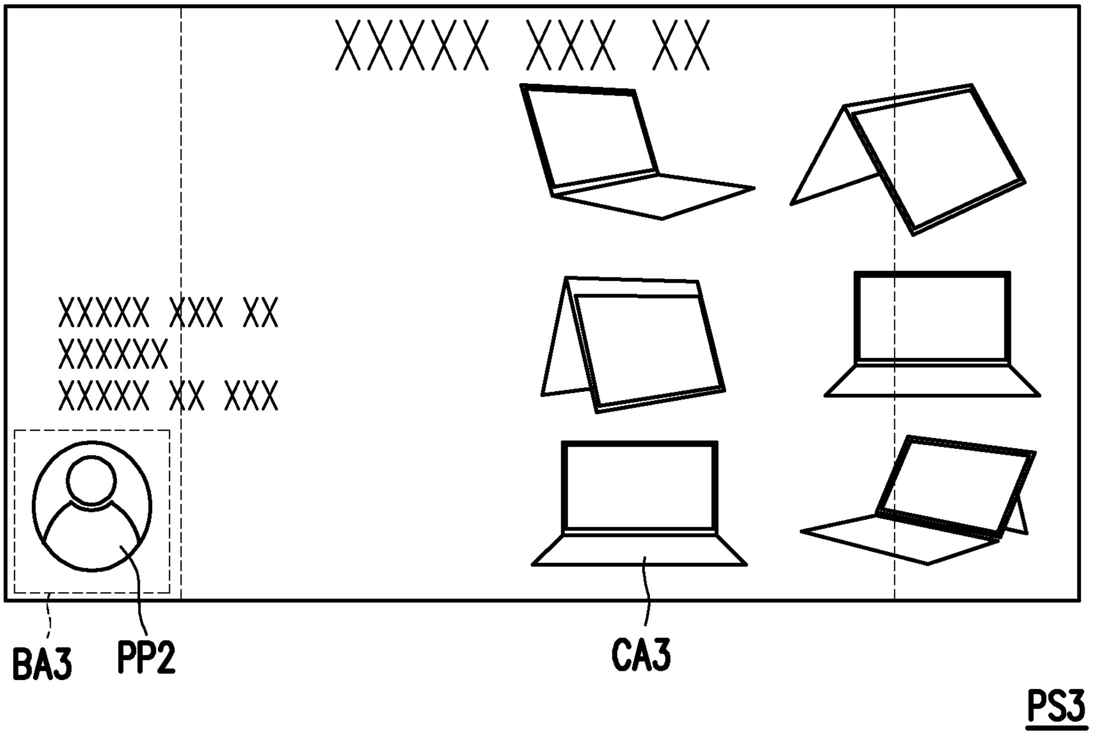
FIG. 7 is a schematic diagram illustrating changing the shape of an image according to an embodiment of the disclosure.

In an embodiment, according to the position and/or shape of the content/background area, the processor 130 may change the shape of the character representative image. For example, FIG. 7 is a schematic diagram illustrating changing the shape of an image according to an embodiment of the disclosure. Referring to FIG. 7, a shared screen PS3 includes the background area BA3 and a content area CA3. The background area BA3 is square. The processor 130 may crop a rectangular character representative image PP2 into a circle. The size of the background area BA3 is larger than the size of the character representative image PP2.

Figure 8:
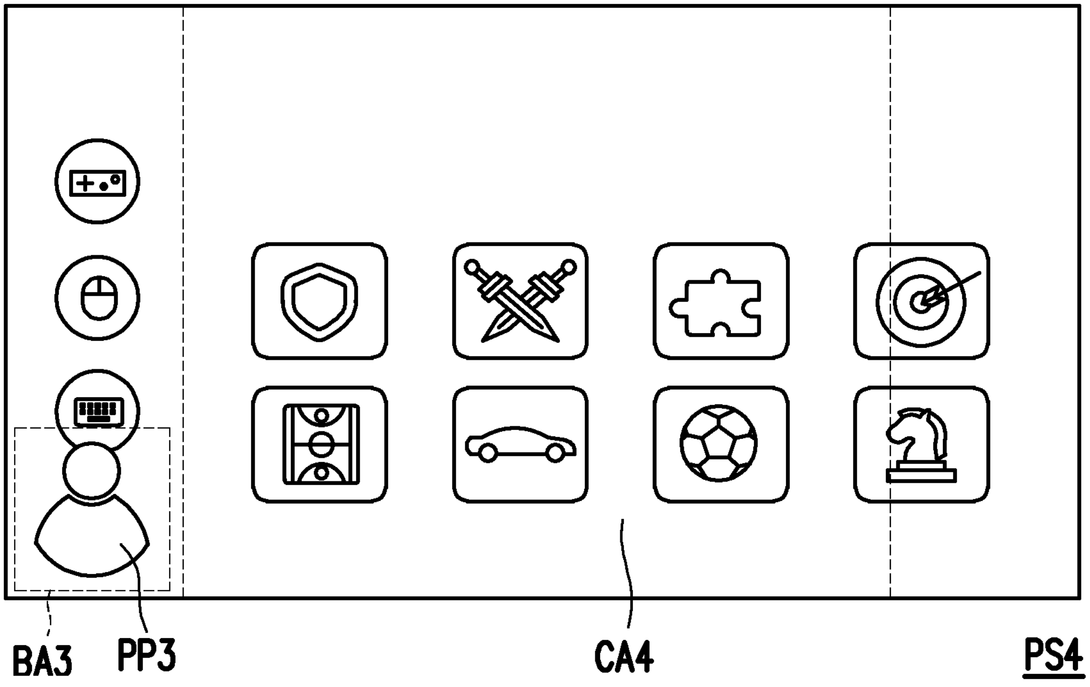
FIG. 8 is a schematic diagram of a background-removed character image according to an embodiment of the disclosure.

In an embodiment, in a case that the size of the background area is smaller than the scaled-down size or the lower limit of the size of the character representative image, the processor 130 may perform background-removing on the character representative image to generate a background-removed character image. For background-removing of images, the sampling-based method or the propagation-based method may be used to calculate the color and transparency of the foreground, and the foreground is captured from the image. The foreground is, for example, an image of merely the character. Since the background is removed, the size of the background-removed character image is smaller than the size of the character representative image. For example, FIG. 8 is a schematic diagram of a background-removed character image according to an embodiment of the disclosure. Referring to FIG. 8, a shared screen PS4 includes the background area BA3 and a content area CA4. A background-removed character image PP3 may be contained in a small background area BA3.

Referring to FIG. 3, the processor 130 presents the character representative image in a background area conforming to the size of the character representative image (Step S330). Specifically, the processor 130 may select one from one or more background areas whose size is larger than or equal to the (scaled-down) size of the character representative image/background-removed character image and present the character representative image/background-removed character image in the selected background area. At this time, the character representative image/background-removed character image covers the selected background area. Taking FIG. 4 as an example, the character representative image PP is presented in the background area BA1. Taking FIG. 6 as an example, the character representative image PP is presented in the background area BA2. Taking FIG. 7 as an example, the circular character representative image PP2 is presented in the background area BA3. The processor 130 can simultaneously display the shared screen and the character representative image through a display (e.g., LCD, LED, Mini LED, or OLED).

In an embodiment, if the processor 130 determines the size according to the arrangement sequence in the background area list, then the processor 130 may select the background area that first conforms to the (scaled-down) size of the character representative image/background-removed character image. Taking FIG. 4 as an example, the background area BA1 is positioned at the first position in the background area list, and the background area BA2 is positioned at the second position in the background area list. The processor 130 first compares the size of the background area BA1 and the character representative image PP. If the size of the background area BA1 is larger than the size of the character representative image PP, then the character representative image PP is presented in the background area BA1. In addition, for the same shared screen PS1, the processor 130 may ignore or prohibit the size comparison of the other background areas BA2 to BA6 with respect to the character representative image PP.

In some embodiments, the quantity of the character representative image/background-removed character image is not limited to one. For example, there may be character representative images/background-removed character images of other participants of the video conferencing. At this time, a corresponding quantity or only a part of the background areas may be selected for presenting other character representative images/background-removed character images.

In an embodiment, the processor 130 may use the image synthesis technology to embed the character representative image/background-removed character image into the shared screen. For example, the color parameters (for example, the values of red, green, and blue) of part or all of pixels in the selected background area on the shared screen are replaced with the color parameters of the character representative image/background-removed character image. In some embodiments, the processor 130 may adjust the transparency of the character representative image/background-removed character image and/or the selected background area. For example, the character representative image has a transparency of 90%.

In an embodiment, the processor 130 may add a window to the selected background area and present the character representative image in the window.

In an embodiment, in a case that the size of the background area is smaller than the scaled-down size or the lower limit of the size of the character representative image (and the background-removed character image has been generated), the processor 130 may allow the character representative image/background-removed character image to cover the content area on the shared screen. Since all background areas cannot contain a complete (scaled-down) character representative image/background-removed character image, in addition to the selected background area, the character representative image/background-removed character image also covers a part of a content area adjacent to the selected background area. The selected background area may be a background area with the largest size among all identified background areas, but is not limited thereto.

In addition, the processor 130 may limit a coverage ratio of the character representative image/background-removed character image covering the content area. The coverage ratio is, for example, 3% or 5% of the content area, but is not limited thereto. In order to conform to the coverage ratio, the processor 130 may crop the character representative image/background-removed character image. For example, the image below the head is removed.

Figure 9:
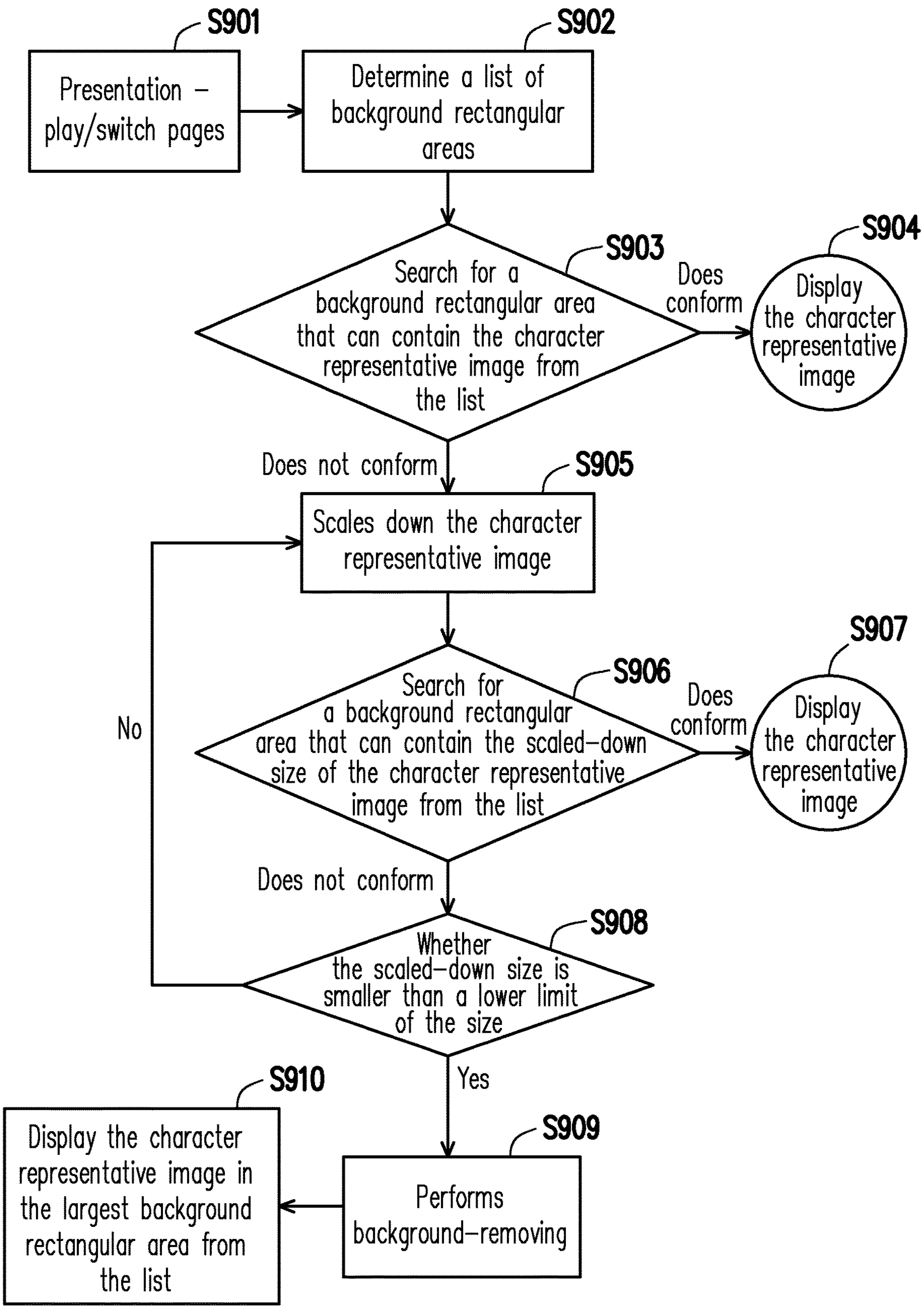
FIG. 9 is a flow chart illustrating an application scenario according to an embodiment of the disclosure.

FIG. 9 is a flow chart illustrating an application scenario according to an embodiment of the disclosure. Referring to FIG. 9, when starting to play a presentation (i.e., the shared screen) or switching pages (Step S901), the processor 130 detects the operation of sharing a real-time image (i.e., the character representative image) of the speaker and finds positions (the sequence of the search is, for example, from lower right to upper left) of all background rectangular areas (i.e., rectangular background areas) in the background of the presentation screen by an object detection model based on machine learning, and a list of background rectangular areas is determined accordingly (Step S902). Taking FIG. 4 as an example, in the areas of the width W2 and W3 on the left and right sides, sequentially find the background areas BA1, BA2, BA3, BA4, BA5, and BA6. The list is arranged according to the sequence of the search. The processor 130 searches for a background rectangular area that can contain the character representative image from the list (Step S903). Taking FIG. 4 as an example, the size of the background area BA1 has conformed to the size of the character representative image, and the character representative image may be presented in the background area BA1 (Step S904).

If there is no background area that conforms to the current size of the character representative image from the list, then the processor 130 scales down the character representative image (Step S905). For example, whenever there is no conforming, 5% of the size is scaled down each time. Next, the processor 130 searches for a background rectangular area that can contain the scaled-down size of the character representative image from the list (Step S906). If there is a background area that conforms to the scaled-down size, then the character representative image of the scaled-down size is displayed in the background rectangular area (Step S907).

If there is no background area that conforms to the scaled-down size the character representative image from the list, then the processor 130 determines whether the scaled-down size is smaller than the lower limit of the size (Step S908). For example, the lower limit of the size is half the initial size. If the scaled-down size is not yet smaller than the lower limit of the size, then the character representative image may be further scaled down (Step S905).

If the scaled-down size is smaller than the lower limit of the size, then the processor 130 performs background-removing on the character representative image (Step S909) to generate the background-removed character image. In addition, the processor 130 finds a background area closest to the background-removed character image from the list and displays the background-removed character image in the background area accordingly. As shown in FIG. 8, the background-removed character image PP3 or the character representative image is displayed in the largest background rectangular area from the list (Step S910).

Figure 10:
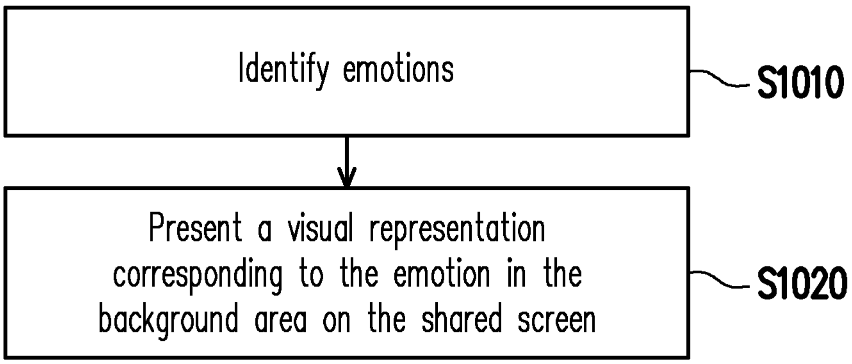
FIG. 10 is a flow chart of emotion-based background visual adjustment according to an embodiment of the disclosure.

FIG. 10 is a flow chart of emotion-based background visual adjustment according to an embodiment of the disclosure. Referring to FIG. 10, the processor 130 can identify emotions (Step S1010). For example, the microphone receives the voice of the speaker, and the processor 130 analyzes the speech features of the sound signal such as pitch and volume to identify the emotion of the speaker. For another example, an image capturing device captures a speaker, and the processor 130 analyzes the image features to identify the emotion of the speaker.

In an embodiment, for a speech identify model based on machine learning, the processor 130 may use the data set to train, test, and/or verify the model. For example, the training data set includes two English data sets, SA VEE (Surrey Audio-Visual Expressed Emotion) and RAVDESS (Ryerson Audio-Visual Database of Emotional Speech and Song), and two Chinese data sets, CASIA (Chinese Academy of Sciences) and NNIME (NTHU-NTUA Chinese Interactive Multimodal Emotion), and the data sets include emotions such as happiness, anger, excitement, fear, sadness, surprise, and neutral. The speech identify model uses the Sample-Level CNNs and train the speech identify model to identify various emotions based on speech features such as zerocrossing rate (ZCR), volume, Mel frequency cepstral coefficient (MFCC), pitch, and Teager energy operator (TEO).

Referring to FIG. 10, the processor 130 can present a visual representation corresponding to the emotion in the background area on the shared screen (Step S1020). The visual representation may be colors, patterns, texts, or animations. For example, the processor 130 performs background-removing on the character representative image and presents the corresponding visual representation in the removed background. The background-removed character image and the visual expression corresponding to the emotion are simultaneously presented in the selected background area. For another example, an emoticon is displayed in the selected background area.

Figure 11:
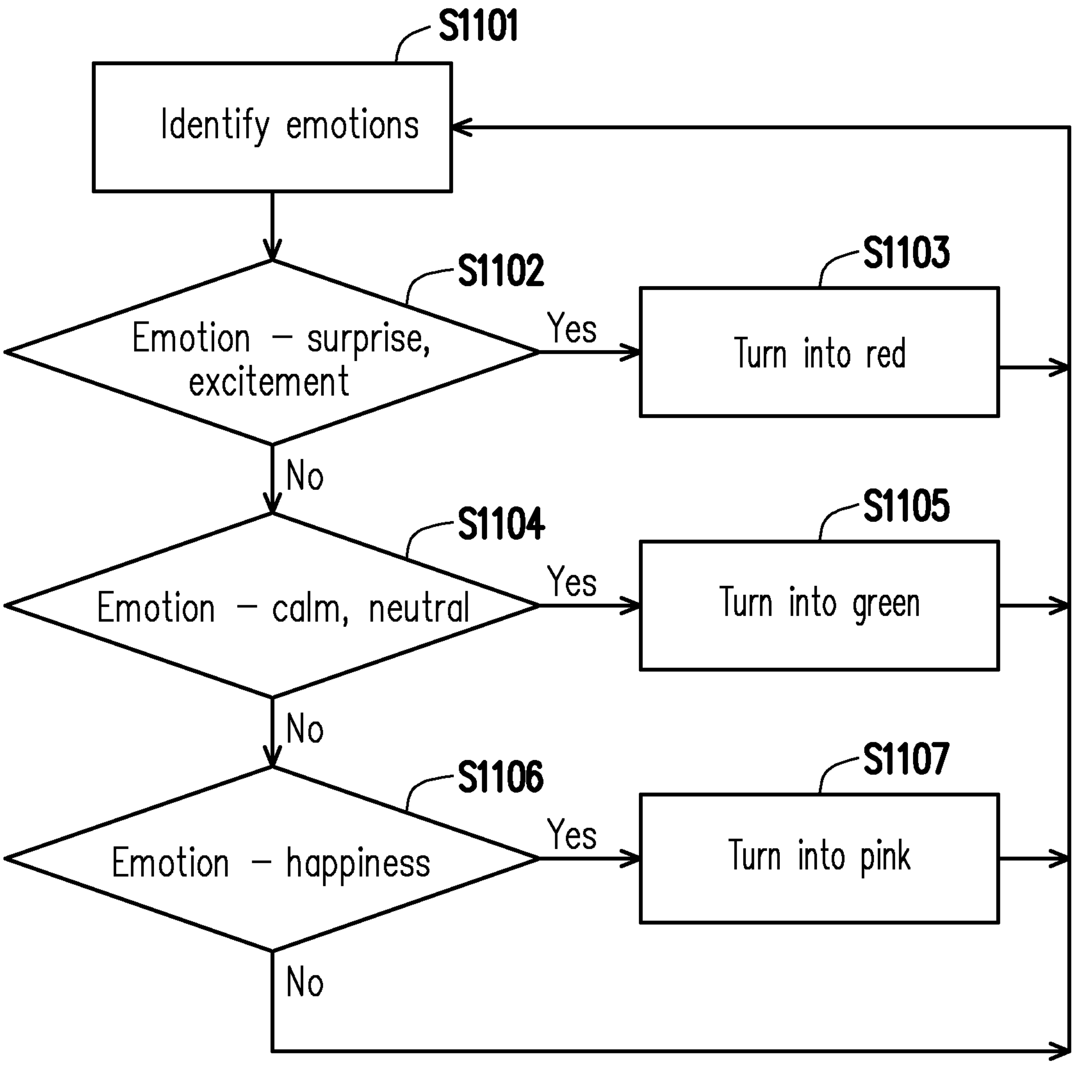
FIG. 11 is a flow chart illustrating another application scenario according to an embodiment of the disclosure.

FIG. 11 is a flow chart illustrating another application scenario according to an embodiment of the disclosure. Referring to FIG. 11, the processor 130 can identify the emotion of the speaker when speaking through the speech identify model (Step S1101). If the emotion is surprise or excitement (Step S1102), then the background in the selected background area other than the background-removed character image is turned into red (Step S1103). If the emotion is calm or neutral (Step S1104), then the background in the selected background area other than the background-removed character image is turned into green (Step S1105). If the emotion is happiness (Step S1106), then the background in the selected background area other than the background-removed character image is turned into pink (Step S1107).

In summary, in the image processing method for video conferencing according to the embodiments of the disclosure, the background area on the shared screen may be identified, and the character representative image can be presented in the background area conforming to the size. In addition, in the embodiments of the disclosure, the character representative image can be scaled down, the character representative image can be background-removed or the transparency thereof changed, or the shape of the background area can be changed according to requirements. In this way, the character representative image blocking the content area on the shared screen can be avoided/reduced, so that the audience can smoothly see the complete briefing content. On the other hand, in the embodiments of the disclosure, the emotion of the speaker can be determined based on the tone of the speech, and the corresponding visual representation can be presented, so that the audience can know the change of the emotions of the speaker.

Although the disclosure has been disclosed above in the embodiments, the embodiments are not intended to limit the disclosure. Persons with ordinary knowledge in the technical field may make some changes and modifications without departing from the spirit and scope of the disclosure. Therefore, the protection scope of the disclosure shall be determined by the appended claims.

What is claimed is:

1. An image processing method for video conferencing, comprising:

identifying a plurality of background areas in a shared screen by using an object detection model, wherein the background areas are areas other than content areas in the shared screen, and the content areas are the area where at least one of the text, symbols, patterns, pictures and object images in the shared screen is located;

organizing the plurality of background areas into a background area list with a priority sequence based on positions or sizes of the plurality of background areas on the shared screen determined by the object detection model;

determining, based on the priority sequence in the background area list, whether a size of a candidate background area conforms to a size of a character representative image, and determining whether the size of the candidate background area conforms to the size of the character representative image comprises:

determining whether the size of the candidate background area conforms to a scaled-down size of the character representative image in a case that the size of the candidate background area is smaller than the size of the character representative image, wherein determining whether the size of the candidate background area conforms to the scaled-down size of the character representative image comprises:

performing background-removing on the character representative image to generate a background-removed character image and a removed background in a case that the size of the candidate background area is smaller than the scaled-down size of the character representative image;

identifying an emotion; and presenting the background-removed character image and a visual representation corresponding to the emotion in the removed background of the character representative image.

2. The image processing method for video conferencing as claimed in claim 1, wherein determining whether the size of the candidate background area conforms to the size of the character representative image further comprises:

determining whether the size of the candidate background area is larger than or equal to the size of the character representative image; and determining that the size of the candidate background area conforms to the size of the character representative image in a case that the size of the candidate background area is larger than or equal to the size of the character representative image.

3. The image processing method for video conferencing as claimed in claim 1, wherein presenting the background-removed character image in the background area comprises:

allowing the background-removed character image to cover a content area on the shared screen; and limiting a coverage ratio of the background-removed character image covering the content area.

4. An image processing apparatus for video conferencing, comprising:

a storage configured to store a program code; and a processor coupled to the storage, loaded with the program code, and configured to:

identify a plurality of background areas in a shared screen by using an object detection model, wherein the background areas are areas other than content areas in the shared screen, and the content areas are the area where at least one of the text, symbols, patterns, pictures and object images in the shared screen is located;

organize the plurality of background areas into a background area list with a priority sequence based on positions or sizes of the plurality of background areas on the shared screen determined by the object detection model;

determine, based on the priority sequence in the background area list, whether a size of a candidate background area conforms to a size of a character representative image, and determine whether the size of the candidate background area conforms to the size of the character representative image comprises:

determine whether the size of the candidate background area conforms to a scaled-down size of the character representative image in a case that the size of the candidate background area is smaller than the size of the character representative image, wherein determine whether the size of the candidate background area conforms to the scaled-down size of the character representative image comprises:

perform background-removing on the character representative image to generate a background-removed character image and a removed background in a case that the size of the candidate background area is smaller than the scaled-down size of the character representative image;

identifying an emotion; and present the background-removed character image and a visual representation corresponding to the emotion in the removed background the character representative image.

5. The image processing apparatus for video conferencing as claimed in claim 4, wherein the processor is further configured to:

determine whether the size of the candidate background area is larger than or equal to the size of the character representative image; and determine that the size of the candidate background area conforms to the size of the character representative image in a case that the size of the candidate background area is larger than or equal to the size of the character representative image.

6. The image processing apparatus for video conferencing as claimed in claim 4, wherein the processor is further configured to:

allow the background-removed character image to cover a content area on the shared screen; and limit a coverage ratio of the background-removed character image covering the content area.

* * * * *